United States Patent

Gomm et al.

[11] Patent Number: 5,131,359
[45] Date of Patent: Jul. 21, 1992

[54] ROTATING HEAD AND PISTON ENGINE

[76] Inventors: Thiel J. Gomm, 3893 W. 65 South, Idaho Falls, Id. 83402; Noal C. Messick, 220 E. Maple, Shelley, Id. 83274

[21] Appl. No.: 434,005

[22] Filed: Nov. 9, 1989

[51] Int. Cl.$^5$ .............................. F02B 53/00
[52] U.S. Cl. ................... 123/248; 418/195
[58] Field of Search ............ 123/248, 249, 237, 238; 418/195, 207, 226

[56] References Cited

U.S. PATENT DOCUMENTS

| | | | |
|---|---|---|---|
| 1,719,378 | 7/1929 | Moritz | 418/195 |
| 1,773,635 | 8/1930 | Simmons | 418/195 |
| 1,839,147 | 12/1931 | Gray | 418/195 |
| 2,062,446 | 12/1936 | Collum | 418/195 |
| 3,220,387 | 11/1965 | Creager | 123/248 |
| 4,391,574 | 7/1983 | Medel et al. | 418/195 |

FOREIGN PATENT DOCUMENTS

| | | | |
|---|---|---|---|
| 487536 | 9/1975 | Australia | 418/195 |
| 209752 | 5/1909 | Fed. Rep. of Germany | 418/195 |
| 397389 | 8/1933 | United Kingdom | 418/195 |
| 2104154 | 3/1983 | United Kingdom | 418/195 |

*Primary Examiner*—Michael Koczo

[57] ABSTRACT

Features of this apparatus include a carrier ring with attached concentrically rotating pistons which tangentially couple forces from expanding gasses to a power transfer means, a rotating head with windows to allow piston passage, fuel admittance and exhaust ports to provide fuel intake and combusted gas removal without using reciprocating action, a power transfer means to couple power from the rotating pistons to a power output shaft, a means of simultaneous fuel admittance and exhaust gas removal, a unique sealing apparatus, and a balanced firing arrangement where two or more pistons symmetrically arranged with respect to their axis of rotation are simultaneously forced by expanding gases to rotate about their center of rotation in a concentric fashion. These features enable the apparatus to utilize maximum torque through the entire power stroke, do not require reciprocating motion, eccentric piston surface motion or angular deflection. The combustion force vectors, which force piston rotation, are always tangent to the arc of piston rotation and in line with piston travel. Rotation is very smooth and bearing loading is reduced due to the balanced firing arrangement and because the apparatus operates in a concentric manner.

14 Claims, 9 Drawing Sheets

LEGAND

40 AVAILABLE CRANKING FORCE
40 APPARATUS DELIVERED FORCE
41 RECIPROCATING ENGINE POWER TRANSFER FACTOR
42 RECIPROCATING ENGINE DELIVERED FORCE
43 APPARATUS POWER TRANSFER FACTOR

SIDE ELEVATION

FRONT SECTION

PLAN SECTION 5-5

APPARATUS FRONT VIEW

ROTATING HEAD AND PISTON ENGINE

BACKGROUND OF THE INVENTION

1. Field of Invention

The present invention relates generally to apparatus and method of converting combustion energy into other useful forms of energy by the use of continuous concentrically rotating pistons in one direction, within a toroidal bore, said pistons transfer force through the outer radius of the present invention to a power shaft. This type of apparatus lends itself to energy conversion applications involving external as well as internal combustion. The present invention represents a significant improvement over previous similar types of apparatus.

2. Description of Prior Art

In rotary engines of this type, deflagration or externally combusted gasses or fluids have been used as motive force. Charges of hot gasses or fluids are introduced into the bore or in a separate combustion chamber, at timed intervals, behind the continuously moving pistons. A rotating disk, which performs the function of a head in conventional engines, serves to form a plurality of combustion chambers and as a wall for the expanding gasses to push against. When this type of engine is configured for internal combustion, means of inputting fuels has here-to-fore included either aspiration or use of a separate compressing means to force fluids into the combustion chamber.

In addition to rotary engines of the same type of the present apparatus, the ability to transfer combustion energy to other usable forms of energy is currently accomplished by at least three types of apparatus: the reciprocating engine, the Wankel engine and the turbine engine.

In a reciprocating engine the relationship of horsepower vs. fuel economy is influenced by the number and size of pistons. Each piston in a reciprocating engine must start and stop twice each crankshaft revolution. Referring to FIG. 1, the efficiency of transferring available cranking force 40 to the crankshaft varies sinusoidally as a function of the power transfer factor 41. Minimum power transfer factor 41 occurs at top dead center (the beginning of the power stroke, reference FIG. 1, 0 displacement) and at 180 degrees from top dead center (the end of the power stroke, 1.0 displacement). The maximum power transfer factor occurs near 90 degrees from top dead center (the middle of the power stroke, 0.5 displacement factor). The available cranking force 40 pushing on the piston is greatest at the beginning of the power stroke (0 displacement) and decreases as the piston displacement increases. Thus, the smallest percentage of energy transfer (smallest power transfer factor) occurs at the time when forces acting on each piston are greatest and least (1.0 and 0 displacement, respectively). Cranking force (delivered force) 42 delivered to the crankshaft of a reciprocating engine, during a power stroke, is substantially less than the available power 40 because of the sinusoidal power transfer factor 41 inherent in reciprocating engines. Actual delivered cranking force is less than the delivered force described in FIG. 1, because of constant linear piston and valve acceleration and friction in the reciprocating engine.

Wankel type engines use sets of two chambers. Combustion forces are applied to a geared rotor (piston) forcing it to travel about a center of rotation in an eccentric fashion. The rotational center of gravity of the rotor orbits about the center of rotation of the crankshaft causing an imbalance. This is somewhat offset by using additional rotors with their centers of gravity symmetrically located about their crankshaft. Imbalance along the center of rotation is still present because the rotors are not orbiting about a single point. At the beginning of the power stroke, the combustion forces are in line with the center of rotation of the crankshaft, resulting in no energy transfer at this point. This is also true at the end of the power stoke. Hence, the same type of power transfer inefficiencies discussed in the reciprocating engine are also present in the Wankel engine. The pistons (rotor surfaces) in the Wenkel engine are always accelerating do to the eccentric path the pistons follow.

The turbine uses expanding gases to push against slanted blades. Several stages of blades may be used to extract more energy from expanding gases. Force vectors causing rotary motion are approximately forty five degrees with respect to blade rotation and require stationary deflectors to redirect the flow of expanding gases. When forces are applied against stationary deflectors, energy is expended without being transformed into rotary motion. Two sources of wasted energy in turbines are: the angle of deflection of expanding gas pressure on rotating turbine blades and energy loss as gasses are deflected off stationary deflectors.

SUMMARY OF THE INVENTION

The present apparatus may be used equally well as an internal or external combustion engine. For simplicity, in the discussion which follows, the apparatus is treated as an internal combustion engine. The method of operation as an external combustion engine is identical to the internal combustion engine except 1) hot gases under pressure, instead of air/fuel mixture, are ported into the expansion chamber at the beginning of the power stroke, 2) the formed chamber acts as an expansion, rather than combustion, chamber and 3) no form of internal ignition is required.

When the engine is used for internal combustion, just prior to the beginning of the power stroke, combustible gases are forced into the combustion chamber. This is done by forcing previously compressed air/fuel mixture through an inlet port. It should be noted that compressed air can be ported into the combustion chamber prior to injecting fuel into the chamber. If the air pressure is high enough, the engine can act as a diesel. When a port in the rotating head aligns with an air/fuel inlet port, the air/fuel mixture is admitted into the combustion chamber. As the rotating head continues to rotate, the port in the rotating head is no longer aligned with the air/fuel admittance port and admittance ceases. A spark plug (or other means of ignition) is used to ignite the air/fuel mixture. Gas expansion forces are in line with the direction of travel of each rotating piston (tangent to the arc of the rotating piston). These forces are also perpendicular to the direction of travel of the rotating head. Firing occurs shortly after each piston has passed through a rotating head window. A present apparatus designed with two pistons and a single rotating head will have four firings (power strokes) per power output shaft revolution. An eight cylinder four stroke reciprocating engine provides four firings per power output shaft revolution. The Wankel engine has one firing per rotor per crankshaft revolution. The example of the two piston apparatus previously cited is equivalent to a four rotor Wankel engine or an eight cylinder four stroke reciprocating engine.

In the present apparatus, spent gases from the previous combustion are swept out through an exhaust port by the leading surface of the each piston. A path to the exhaust port is made available to the current expanding gas as the piston passes the exhaust port just prior to the time the rotating head window begins to open the combustion chamber. The exhaust path remains open for nearly the entire duration of the next power stroke, until it is terminated by the next piston passing the exhaust port. Hence, the current power stroke and removal of exhaust from the previous power stroke occur simultaneously. Combustion and exhaust gasses are separated by each piston and the rotating head.

A window in the rotating head provides a means for piston passage through the rotating head. When the window passes the piston path, a combustion chamber is formed between the rotating head and the piston.

Transfer of power from piston rotation to the power output shaft is accomplished by a unique piston carrier ring and a power transfer mechanism.

In the present apparatus, concentrically rotating pistons experience constant angular acceleration at a given engine RPM. Constant angular acceleration of an object, attached to it's fixed center of rotation, does not cause loss of energy.

An object of the present invention is to produce greater horsepower, torque and fuel efficiency through a more efficient means of energy transfer.

Another object of the present invention is to produce greater horsepower and fuel efficiency by eliminating linear and eccentric acceleration of pistons.

Another object of the present invention is to provide greater horsepower and fuel efficiency by eliminating reciprocating action of inlet and exhaust valves.

Another object of the present invention is to produce greater power transfer by simultaneously firing combustion gasses which act on pistons symmetrically arranged with respect to their center of rotation, producing power strokes which reduce bearing loading and couple more power to the power transfer mechanism.

Another object of the present invention is to reduce the number of moving and stationary parts as opposed to reciprocating engine parts count.

Another object of the present invention is to obtain multiple firings per piston per revolution, providing greater horsepower per engine size.

Another object of the present invention is to obtain a longer lever arm per engine size, providing greater horsepower/torque per engine size.

Another object of the present invention is to obtain a longer power stoke per engine size, providing greater horsepower/torque per engine size.

Yet Another object of the present invention is to provide a means of highly efficient internal or external combustion power conversion.

Still another object of the present invention is to provide simultaneous power stroke and exhaust removal means, using both sides of each piston and the rotating head to separate combustion and exhaust gasses.

DETAILED DESCRIPTION OF THE INVENTION

Figure 1:
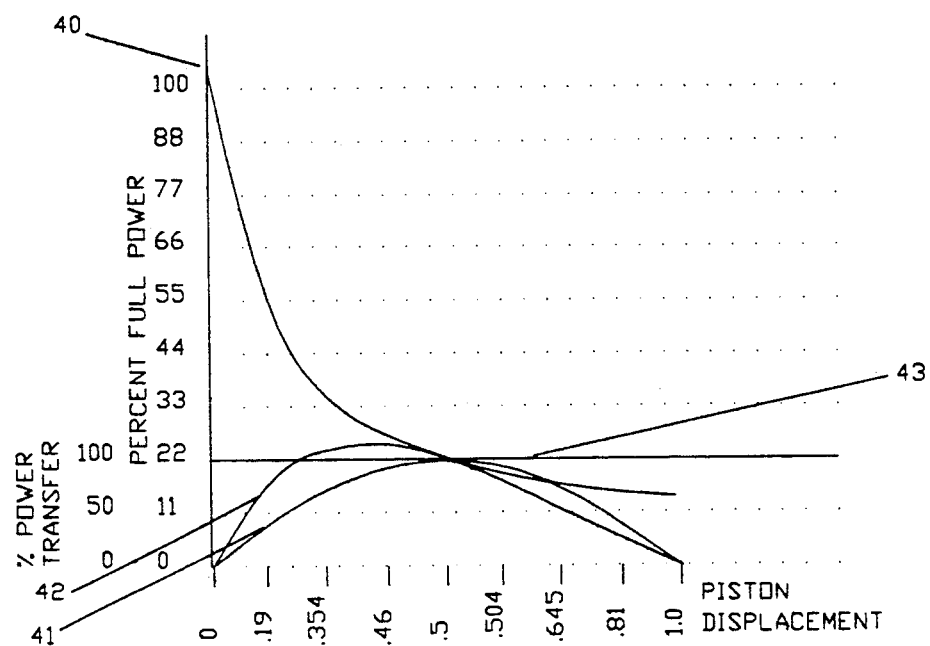
FIG. 1 is a force transfer graph.

Referring to the drawings, like components in various drawings are labeled with the same number.

Figure 2:
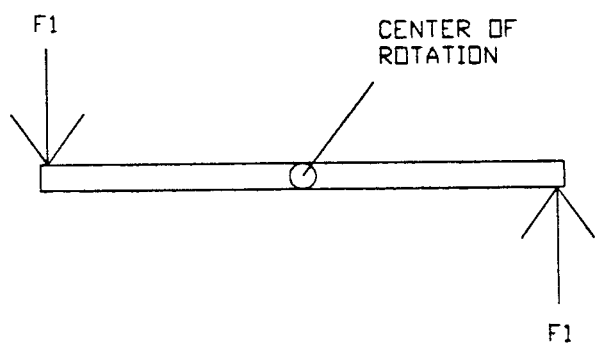
FIG. 2 is a balanced power stroke forces representation.
Figure 3:
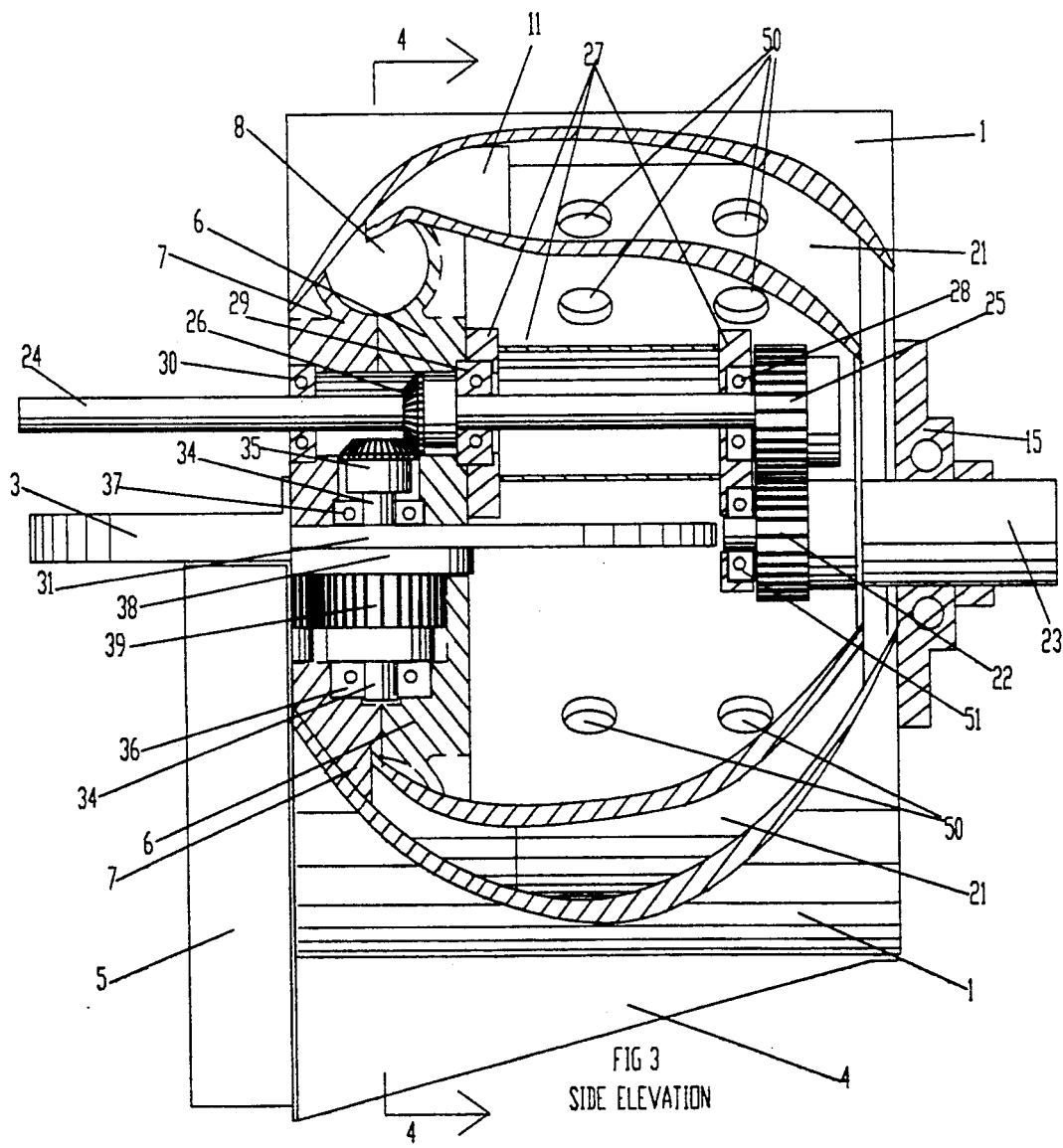
FIG. 3 is a side view section with cut-away showing inside of engine.
Figure 4:
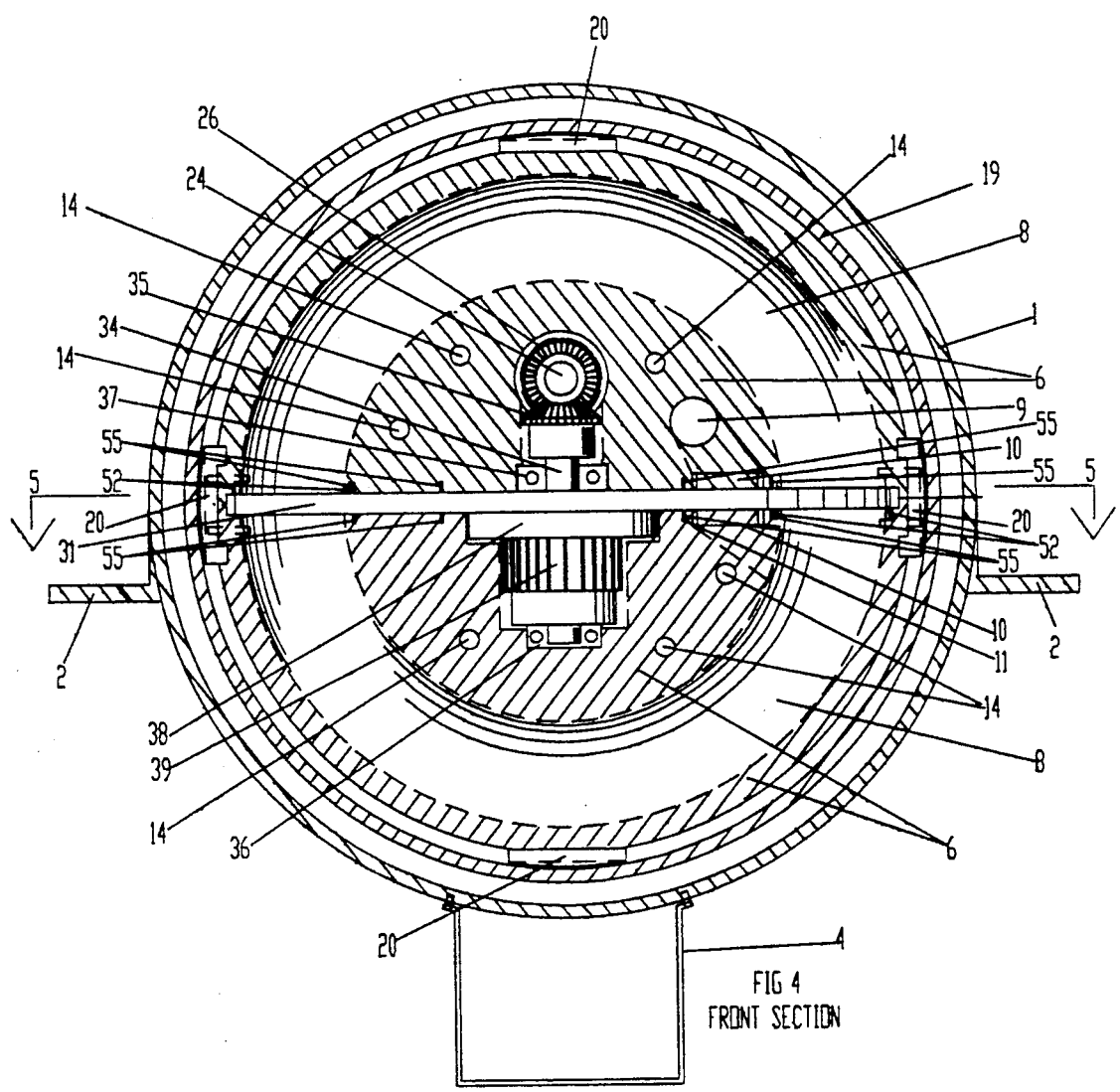
FIG. 4 is a front section.
Figure 5:
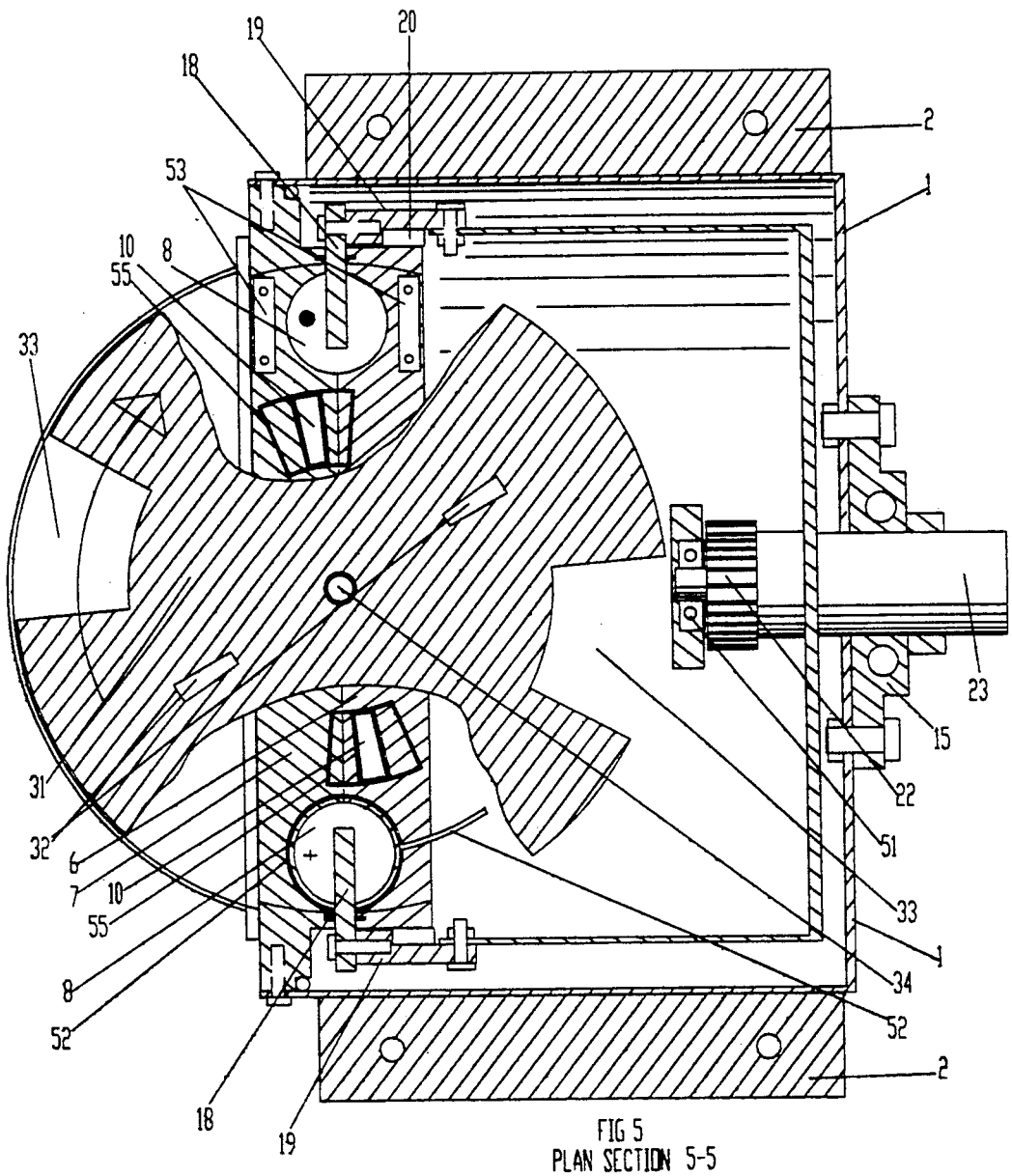
FIG. 5 is a plan section.
Figure 6:
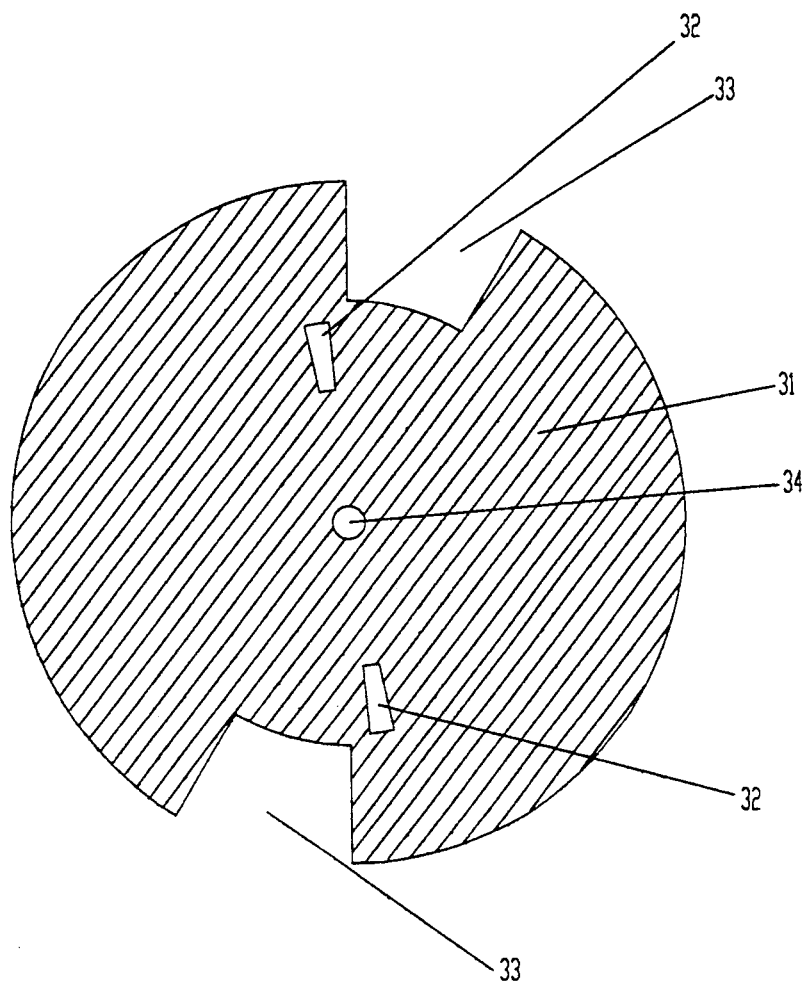
FIG. 6 is a rotating head view.
Figure 7:
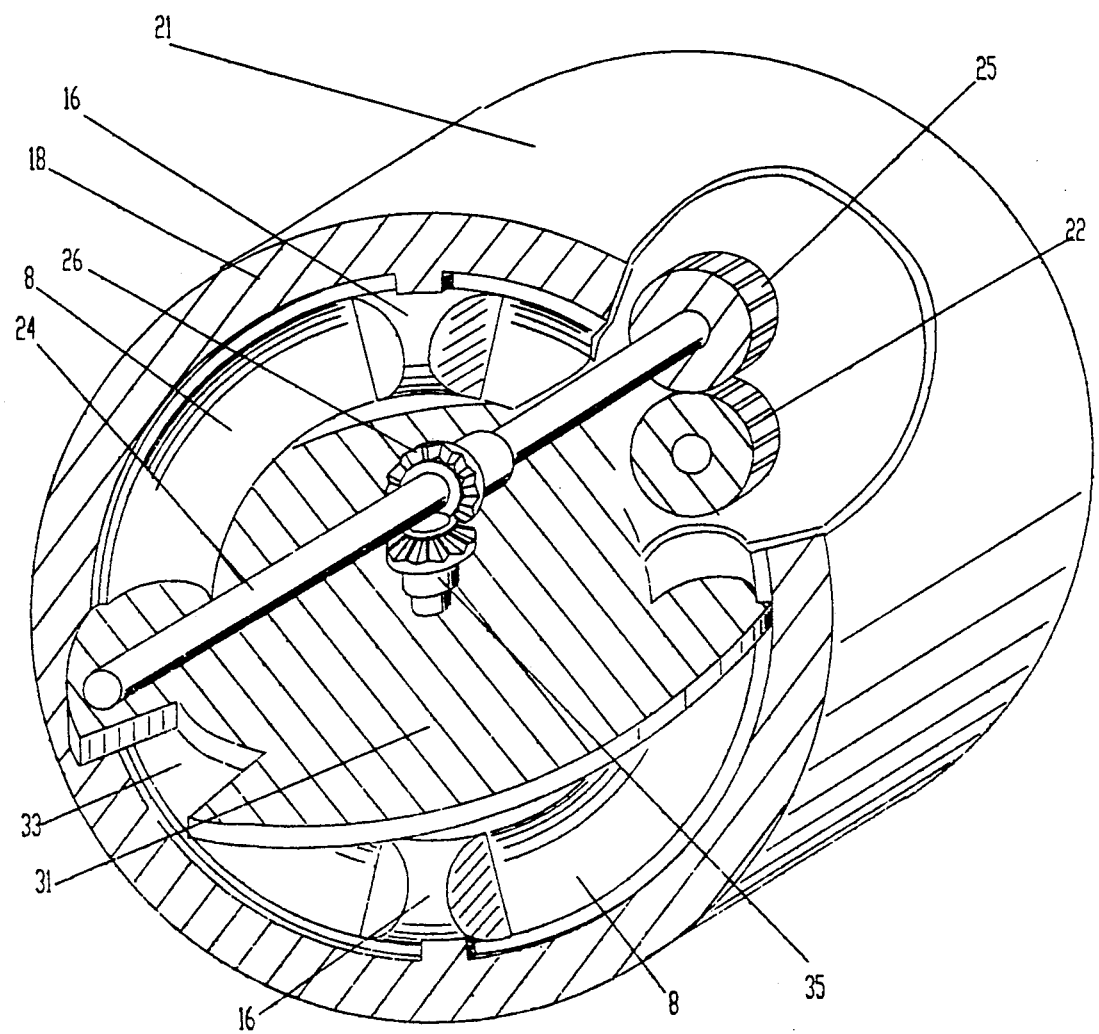
FIG. 7 is a descriptive isometric view showing the relationship between the rotating pistons, cylinder, and rotating head.
Figure 8:
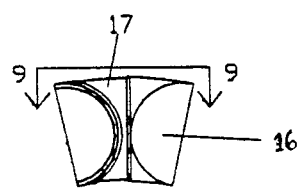
FIG. 8 is a piston (with seals) side view.
Figure 9:
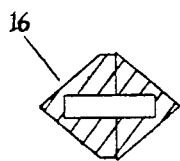
FIG. 9 is a piston (without seals) plan view.
Figure 11:
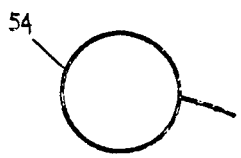
FIG. 11 is a rotating head seal.
Figure 10:
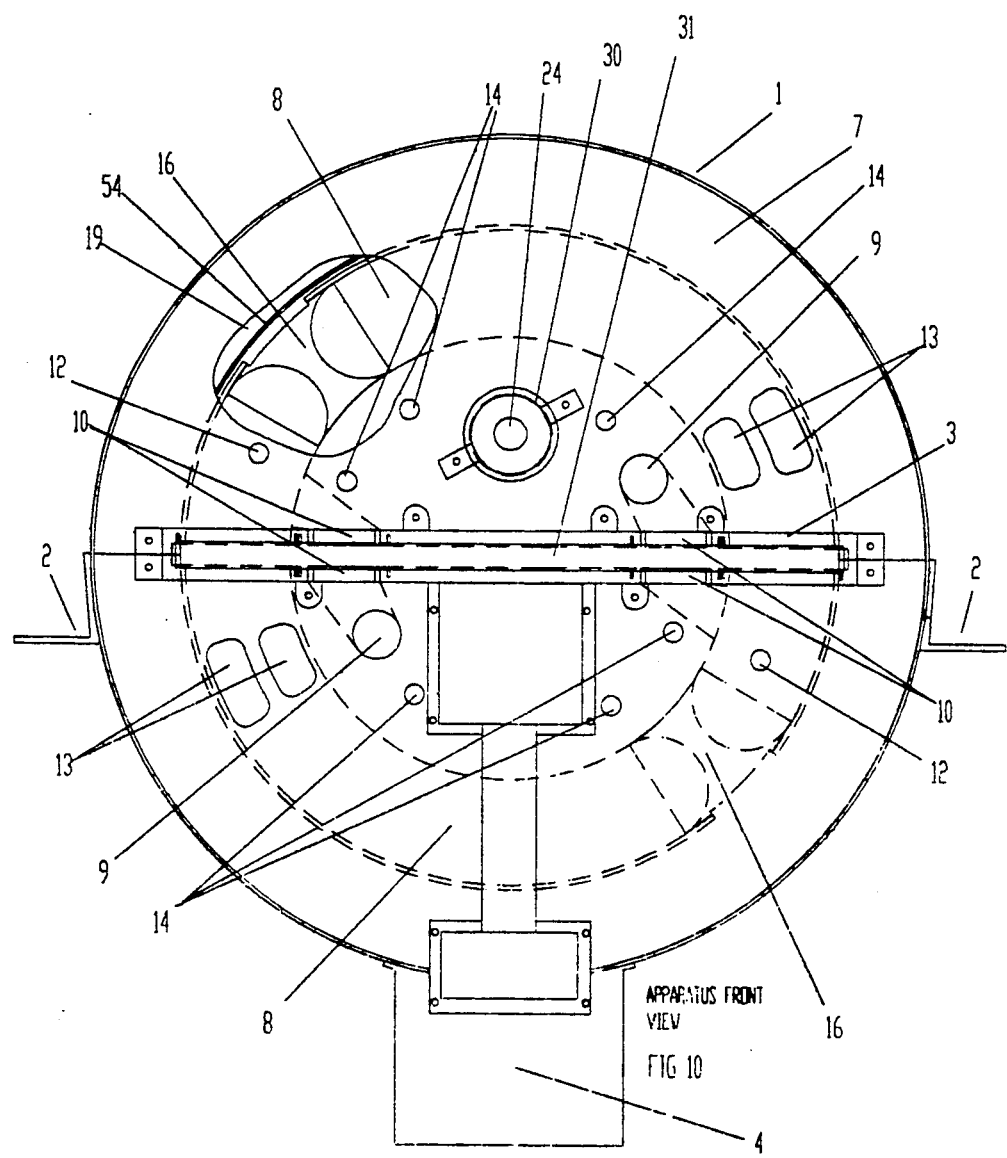
FIG. 10 is a front view.

The present invention provides a here-to-fore unavailable improvement in delivered horsepower, torque and efficiency. Multiple numbers of pistons, piston carrier ring, air/fuel admittance and exhaust ports, cylinder paths and rotating heads may be used, 1,2,3 etc. In the embodiment disclosed here-in, two pistons and one rotating head are used. Pistons are oriented symmetrically about their center of rotation. The combustion gasses associated with each piston are fired simultaneously. Simultaneous power strokes create an evenly balanced rotational force (reference FIG. 2) about the center of rotation of the pistons. This evenly balanced force minimizes lateral force on the center of rotation. Minimum lateral force results in minimum shaft bearing loading and friction.

Major stationary components of the apparatus associated with the engine include the engine housing 1, engine mount 2, rotating head cover 3, oil sump 4, oil pump drive housing 5, engine block inner half 6, engine block outer half 7, toroidal bore 8, air/fuel inlet 9, air/fuel admittance port 10, air/fuel inlet port seal 11, spark plug (fuel injector when used as a diesel) 12, exhaust port 13, engine block bolt 14, power output bearing 15, auxiliary shaft drive bearing 51, chamber seal 52, bearing ring bearings 20, and the rotating head thrust bearing 53. Components of the present apparatus associated with power transfer consist of the piston(s) 16, piston seal 17, piston carrier ring 18, carrier bearing ring 19, power transfer cylinder 21, auxiliary shaft drive gear 22, power output shaft 23. Present apparatus components associated with transferring of power to the rotating head 31 include the auxiliary shaft 24, auxiliary shaft driving gear 25, rotating head driven miter gear 26, auxiliary shaft bearing support bracket 27, auxiliary shaft driven bearing 28, auxiliary shaft thrust bearing 29, and the auxiliary shaft driving bearing 30. Components associated directly with the rotating head include the rotating head 31, rotating head ports 32, rotating head window(s) 33, rotating head drive shaft 34, rotating head driving miter gear 35, rotating head drive thrust bearing 36, rotating head drive bearing 37, and the rotating head collar 38.

The rotating head 31 operates synchronously with the rotating pistons 16. The pistons travel in the toroidal bore 8 path. Just prior to the beginning of the power stroke, combustible gases are forced into the combustion chamber. This is done by forcing previously compressed air/fuel (air only when used as a diesel) through the air/fuel admittance port 10 and 32 prior to spark ignition (injecting fuel into the chamber when used as a diesel). When the port 32 in the rotating head 31 aligns with the air/fuel admittance port 10 in the engine block 6 and 7, air/fuel is admitted into the combustion chamber (the air/fuel admittance port 10 in the engine block 6 and 7 is in constant communication with the toroidal bore 8). As the rotating head 31 continues to rotate, the port 32 in the rotating head 31 is no longer aligned with the air/fuel admittance port 10 in the engine block 6 and 7 and air/fuel admittance ceases. Gas expansion forces are in line with the direction of travel of each rotating piston 16 (tangent to the arc of the rotating piston 16). These forces are also perpendicular to the direction of travel of the rotating head 31. Combustion occurs shortly after each piston 16 has passed through the rotating head window 33, by spark ignition or, if the air pressure and temperatures in the combustion chamber are high enough, fuel will detonate when injected into the combustion chamber as in a diesel engine. The rotating head window 33 provides a means for piston 16 passage through the rotating head 31. When the rotating head window 33 has crossed the piston path, a combustion chamber is formed between the rotating head 31 and the piston 16 in the toroidal bore.

The force 40 applied to each piston 16 in the present apparatus is coupled to the power transfer mechanism (comprising 18, 19, and 21) (also coupled to the power output shaft 23) in a manner parallel (tangent to the arc of rotation) to the direction of travel of the piston 16, i.e., the force coupled to the power output shaft 23 is F(pt)=kLnx. In comparison, the combustion forces coupled to the power output shaft of a reciprocating engine is approximated by F(pt)=kLnxsin(p) (Note: This reciprocating engine power transfer equation does not include power losses caused by linear piston acceleration and friction), where;

L is the lever arm (distance from the center of the piston to it's center of rotation), F(pt) is the force (40 in the present apparatus 42 in the reciprocating engine) coupled to the power output shaft 23, k is the available cranking force 40 applied to the piston head at any position in the power stroke, p is the crankshaft angle from top dead center, n is the number of pistons and x is the number of power strokes per revolution.

Sin(p) represents the power transfer factor 41 in a reciprocating engine. The present apparatus has a unity (maximum available) power transfer factor 43. The resulting delivered force 42 to a reciprocating engine is significantly less than the delivered force 40 (20) to the power output shaft 23 of the present apparatus, for the same available cranking force 40 because of the difference in power transfer factors (41 and 43). Wankel type engines also have a sinusoidally varying power transfer factor 41.

The present apparatus has the feature and design of being completely concentrically rotary in motion. Pistons are housed in a unique engine block 6 and 7 with a toroidal bore 8 path formed for concentric orbiting piston travel. Rotating head gearing apparatus 26 and 35 is used to synchronize piston 16 travel with rotating head 31 travel. The side of the rotating head 31 provides a wall for the gases to push against during expansion (expanding gas force on the rotating head is perpendicular to the direction of travel of the rotating head). Each piston 16 is pushed away from this wall by the expanding gases, causing piston travel. The pistons 16 are attached to a piston carrier ring 18. The piston carrier ring 18 penetrates the entire outer radius of the toroidal bore and maintains concentric piston rotation. The pistons 16 and piston carrier ring 18 are attached to the power transfer cylinder 21 to provide direct energy transfer from each piston 16 to the power output shaft 23. Seals are provided to seal around the intake ports 55, along the carrier ring 54, between the cylinder and the rotating head 52 and a piston seal 17 around each piston 16.

The power transfer cylinder 21 is unique in that power is coupled to the power output shaft 23 through a cylinder means. The configuration of the power transfer cylinder 21 allows the rotating head 31 to be installed in the center of the power transfer cylinder apparatus. This configuration minimizes the number of engine parts by reducing the number of rotating head means required for apparatus construction and makes it more compact. An alternate configuration may be used in which the power transfer means is in the shape of a disk means. In this case, the disk means acts as the piston carrier and the power transfer means. This means allows one or more rotating heads to be located about the periphery of the piston path.

The piston seals 17 are uniquely designed. If a normal piston seal ring, such as is used in the reciprocating engine, was used in the present apparatus, ring expansion in the rotating head path would not allow it to pass through the path traversed by the rotating head 31. To prevent expansion at improper times, the piston 16 and piston seal 17 are designed such that a portion of the seal is always touching the toroidal bore 8 wall as the piston 16 and piston seal 17 pass through the rotating head 31 path.

The rotating head seal 52, which seals between the expansion chamber and the rotating head 31, is also uniquely designed for this type of engine. This seal is designed to maintain it's sealing position as the rotating head window 33 passes by the rotating head seal 52. The rotating head seal 52 is mounted in a grove and is held in place by a "tail" which is in contact with the rotating head 31 as the rotating head window 33 passes the body of the rotating head seal 52.

The intake port has a double seal 55, uniquely designed to seal against seepage of air/fuel mixture as the fuel admittance port 32 on the rotating head moves into and out of alignment with the stationary air/fuel admittance port 10.

Each piston 16 is also uniquely designed. The trailing surface of the piston 16 is wedge-shape to provide a minimum space for gases to occupy when the combustion chamber is charged, after the rotating head 31 closes the combustion chamber. The shape of both ends of the piston 16 surfaces also provides minimal rotating head 31 travel for the dynamic opening and closing of each combustion chamber. It also allows piston seals 17 to remain in place as they pass through the path of the rotating head 31.

The rotating head window 33 is also shaped to allow minimum open time during piston 16 passage. The shape of the edges of the rotating head window 33, and the shape of the piston 16 enable maximum power stroke length.

The cross sectional plane of the piston 16 selected for the present apparatus is round. Other cross sectional shapes may be used. The shape of the piston 16 can affect the gas expansion ratio. A rectangular or pie shaped piston 16 and toroidal bore 8 can close the chamber in less piston 16 travel. Closing the chamber in less piston travel increases the combustion gas expansion ratio.

A rotating head thrust bearing 53 is provided between the side of the path in the engine block 6 and 7, where the rotating head 31 travels, and the side of the rotating head 31 opposite the side acting as a surface of the combustion chamber. This bearing 53 prevents deflection and drag on the rotating head 31 as it is exposed to expanding gas pressure.

The lever arm in the present apparatus is inherently longer per engine size than existing piston engines. This longer lever arm provides greater torque and a longer power stroke per engine size.

The present apparatus uses a typical lubricating system including: an oil sump 4 which accumulates oil which has completed it's lubricating and cooling function after it has been forced by an oil pump to various areas in the present apparatus which require lubrication. The present apparatus power transfer cylinder 21 is provided with oil relief holes 50, to allow accumulating oil in the power transfer mechanism to be expelled to the engine housing 1 inner wall. The slope of the holes 50 are oriented in the power transfer cylinder 21 in such a manner that the force of the oil traveling though the holes aids power transfer cylinder 21 rotation. From the engine housing 1 inner wall, the oil migrates via gravitational force to the oil sump 4 at the bottom of the engine housing 1.

We claim:

1. A rotary piston combustion engine comprising:
    a housing means, housing the entire engine
    an engine block housing a single toroidal bore, said toroidal bore containing at least one wedge shaped piston,
    a piston carrier ring spaced outwardly along the entire perimeter of said toroidal bore with at least one finger extending inwardly for piston attachment,
    a power transfer cylinder, with an end plate, in said power transfer cylinder containing holes provided in the periphery to allow lubrication oil to return to an oil sump, said power transfer cylinder attached to said piston carrier ring for transfer of power along the outer radius of the present apparatus,
    a power output shaft, for driving loads, which is affixed to the end plate of said cylinder and penetrates the engine housing and is supported by an output bearing, said output bearing is attached to said engine housing, said power transfer cylinder end plate has attached driving gearing means for driving an auxiliary shaft,
    an auxiliary shaft with driven gearing means meshing with said driving gearing means, the auxiliary shaft extending through the engine block for the purpose of driving auxiliary equipment, gearing means along the intermediate portion of the auxiliary shaft for the purpose of driving a rotatable disk and an oiling mechanism,
    a rotating head with windows for piston passage, driven by said gearing means along said auxiliary shaft in such a way as to provide a 1:1 piston and rotating head ratio synchronous rotation,
    a trapezoidal porting means in the engine block and in the rotating head for porting of pressurized gasses into the toroidal bore, said port in the engine block being in constant communication with the toroidal bore and the rotating head, such that when the port in the rotating head aligns with the port in the block, as will normally occur as the rotating head rotates within it's defined rotational path, pressurized gasses are admitted into the toroidal bore,
    an exhaust port means for the removal of gases, means whereby said pistons operate in a plane which is perpendicular to the plane of operation of the rotating head, both devices rotating about a common center,
    means defining the arrangement of said pistons, rotating head and ports on the rotating head is such that the pistons pass freely through the windows in the rotating head and the rotation of the pistons and the rotating disk cause a chamber to be formed, whereupon the compressed air/fuel mixture is admitted into said formed chamber for combustion twice each revolution, for each piston, the rotating disk then acts as an abutment for expanding gases and the pistons are moved by the expanding gases to provide direct rotational motion, simultaneous with the combustion process, the front of the pistons act to push the exhaust gases from the previous combustion out of said exhaust port, the exhaust port is positioned with respect to the angular position of rotating pistons and rotating head, such that the piston uncovers the exhaust port at the end of the power stroke.

2. Apparatus as set forth in claim 1, in which edges of the rotating head windows are designed in such a manner to allow piston passage in minimum rotating head travel providing a longer power stroke.

3. Apparatus as set forth in claim 1 in which said pistons are forced by the piston carrier ring to maintain concentric piston travel.

4. Apparatus as set forth in claim 1, which provides a bearing means maintaining precision piston to cylinder alignment during piston travel.

5. Apparatus as set forth in claim 1, which provides a piston seal capable of passing through the path traversed by the rotating head without allowing improper seal expansion to occur.

6. Apparatus as set forth in claim 1, which provides a seal which is held between the rotating head and the combustion chamber by a tail as the rotating head window passes by it.

7. Apparatus as set forth in claim 1, which provides a sealing means about stationary fuel admittance ports as the slots in the rotating head move into and out of alignment with the stationary ports.

8. Apparatus as set forth in claim 1 in which holes in the periphery of the power transfer mechanism cylinder are sloped in such a manner that the force of lubricating oil, escaping from the inside of the power transfer mechanism, aids the rotation of the power transfer mechanism.

9. Apparatus as set forth in claim 1, in which external combustion gasses are presented to be admitted into the combustion chamber, without modification to the present apparatus, and the present apparatus functions as an external combustion engine.

10. Apparatus as set forth in claim 1, in which the shape of the pistons are wedge shaped to allow minimum combustion chamber open time while each piston passes through each rotating head window, the wedge shape at the trailing edge of the piston provides minimum space for compressed gas occupancy, prior to ignition, providing higher expansion ratios.

11. Apparatus as set forth in claim 1, in which power is coupled from the rotating pistons to the power output shaft via the piston carrier ring, through the outer radius of a cylindrically shape power transfer means.

12. Apparatus as set forth in claim 1, in which spent exhaust gases are removed by positive displacement through a porting means, without exposing incoming air/fuel mixture to exiting exhaust gases.

13. Apparatus as set forth in claim 1, in which the apparatus is used as a diesel engine by forcing compressed air into the combustion chamber to sufficient pressure to cause detonation when fuel is injected into the same chamber.

14. Apparatus as set forth in claim 1 in which the means of transferring power through the outer radius of the present apparatus enables the pistons and rotating head to travel in perpendicular path, thereby minimizing the time that the rotating head window is open, increasing the length of the power stroke and the expansion ratio and thus the power and efficiency of the device.

* * * * *